United States Patent
Schulze Isfort et al.

(10) Patent No.: US 11,242,259 B2
(45) Date of Patent: *Feb. 8, 2022

(54) METHOD FOR PRODUCING SILICIC ACID WITH VARIABLE THICKENING

(71) Applicant: Evonik Operations GmbH, Essen (DE)

(72) Inventors: Christian Schulze Isfort, Kapellen (BE); Rainer Golchert, Dieburg (DE); Helmut Roth, Mainaschaff (DE); Andreas Hille, Loerrach (DE); Kai Schumacher, Hofheim (DE)

(73) Assignee: Evonik Operations GmbH, Essen (DE)

(*) Notice: Subject to any disclaimer, the term of this patent is extended or adjusted under 35 U.S.C. 154(b) by 160 days.

This patent is subject to a terminal disclaimer.

(21) Appl. No.: 16/263,079

(22) Filed: Jan. 31, 2019

(65) Prior Publication Data

US 2019/0161355 A1 May 30, 2019

Related U.S. Application Data

(63) Continuation of application No. 14/888,610, filed as application No. PCT/EP2014/062356 on Jun. 13, 2014, now Pat. No. 10,280,088.

(30) Foreign Application Priority Data

Jul. 11, 2013 (EP) .................................... 13176112

(51) Int. Cl.
C01B 33/18 (2006.01)
(52) U.S. Cl.
CPC .................. *C01B 33/183* (2013.01)
(58) Field of Classification Search
CPC ....... C01B 33/00; C01B 33/18; C01B 33/183; C08K 3/00; C08K 3/01; C08K 3/016;
(Continued)

(56) References Cited

U.S. PATENT DOCUMENTS

| 3,363,980 A | 1/1968 | Krinov |
| 3,663,283 A | 5/1972 | Hebert et al. |
| 6,811,302 B2 | 11/2004 | Fleischli et al. |
| 7,534,409 B2 | 5/2009 | Schumacher et al. |

(Continued)

FOREIGN PATENT DOCUMENTS

| DE | 20 48 220 A1 | 4/1971 |
| EP | 1 302 236 A1 | 4/2003 |

(Continued)

OTHER PUBLICATIONS

International Search Report dated Sep. 11, 2014 for PCT/EP2014/062356 filed on Jun. 13, 2014.

(Continued)

*Primary Examiner* — Smita S Patel
(74) *Attorney, Agent, or Firm* — Oblon, McClelland, Maier & Neustadt, L.L.P.

(57) ABSTRACT

A process for production of silica having variable thickening wherein
a) a product stream I containing at least a vaporous, hydrolysable and/or oxidizable silicon compound,
b) a product stream II containing oxygen and
c) a product stream III containing at least a combustible gas are made to react, where
d) a feed port in a pipepiece A, the pipepiece A containing one or more static mixing elements, is used to import product stream I into product stream II, or vice versa and thereby create product stream IV, then
e) a feed port in a pipepiece B, the pipepiece B containing one or more static mixing elements,
is used to import product stream III in product stream IV and thereby create product stream V,
f) product stream V leaving pipepiece B is imported into a reaction chamber, ignited therein and reacted in a flame, and
g) the resultant solid material is separated off.

11 Claims, 2 Drawing Sheets

Figure 1:
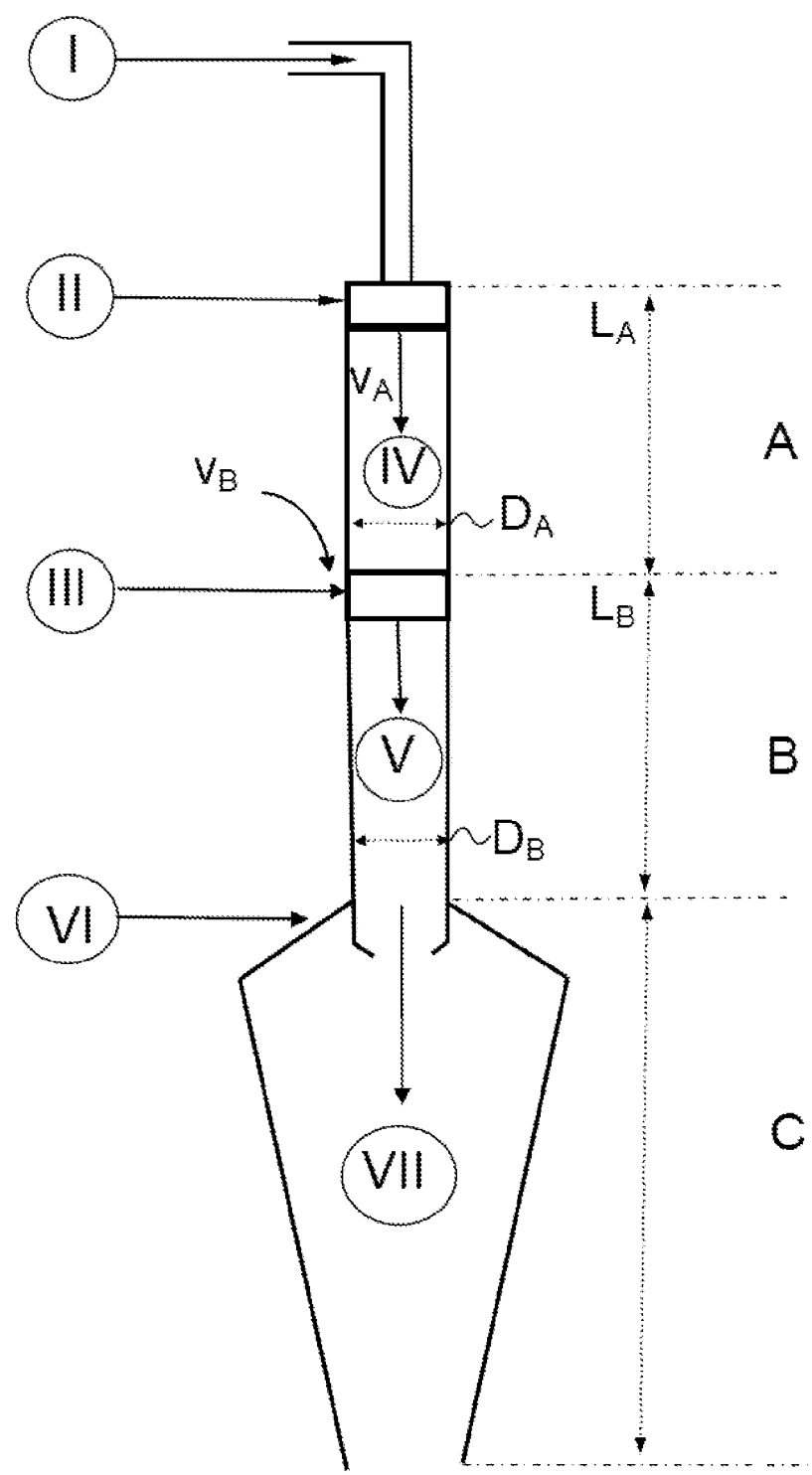

(58) Field of Classification Search
CPC ... C08K 3/36; B01J 21/00; B01J 21/08; B01J 35/00; B01J 35/1023; B01J 35/1014; B01J 35/1019; B01J 35/002; B01J 35/08; B01J 37/00; B01J 37/0238; C09D 7/43; C09D 7/44; C09D 7/62; C09D 7/66; C09D 7/80; C09D 7/67; C09D 7/68; C09D 7/69; C09D 7/61

See application file for complete search history.

(56) References Cited

U.S. PATENT DOCUMENTS

2004/0253164 A1 12/2004 Mangold et al.
2007/0144076 A1 6/2007 Schumacher et al.

FOREIGN PATENT DOCUMENTS

| | | |
|---|---|---|
| EP | 1 486 461 A1 | 12/2004 |
| JP | 60-127215 A | 7/1985 |
| JP | 2003-135945 A | 5/2003 |
| JP | 2004-351414 A | 12/2004 |
| JP | 2006-523172 A | 10/2006 |
| JP | 2008-288266 A | 11/2008 |
| JP | 2011-92925 A | 5/2011 |
| KR | 10-1143130 B1 | 5/2012 |
| KR | 10-2012-0082004 A | 7/2012 |

OTHER PUBLICATIONS

European Search Report dated Nov. 26, 2013 for EP 13 17 6112.4 filed on Jul. 11, 2013.

METHOD FOR PRODUCING SILICIC ACID WITH VARIABLE THICKENING

CROSS REFERENCE TO RELATED APPLICATIONS

This application is a continuation application from U.S. application Ser. No. 14/888,610, filed on Nov. 2, 2015 now U.S. Pat. No. 10,280,088, which is a national stage patent application of international patent application PCT/EP2014/062356, filed on Jun. 13, 2014, the text of which is incorporated by reference, and claims the benefit of foreign priority to EP 131761124, filed on Jul. 11, 2013, the entire contents of which are incorporated herein by reference.

The invention relates to a process for production of silica having variable thickening wherein the feedstocks are mixed by static mixing elements before entry into a reaction chamber.

Processes for producing pyrogenous silicas with high thickening are known. DE-A-2609487 discloses a process wherein pyrogenically formed silica is treated with silicon tetrachloride in a subsequent step and then hydrolysed and deacidified with an air/steam mixture.

DE-A-2904199 proposes a process which comprises a step of introducing into the reaction mixture additional amounts of steam which do not result from the combustion of gases comprising hydrogen needed for the flame hydrolysis.

EP-A-38900 recites a process for production of pyrogenous silica with high thickening wherein siloxanes are converted in the presence of hydrogen and air.

EP-A-97378 discloses a process for adjusting the thickening wherein the pyrolysis flame is supplied with additional energy, for example in the form of a combustible gas.

EP-A-634360 discloses a process wherein gas discharges are produced in the combustion chamber by means of a gas gun.

WO2006/087136 states that high-thickening silicas are obtainable by establishing conditions leading to a highly uniform, radial distribution of temperatures without further specifying these conditions.

Existing solutions for producing high-thickening pyrogenous silica either proceed from costly feedstocks or require costly changes to the equipment. The problem addressed by the present invention was therefore that of providing a process making it possible to provide silica having variable thickening in a simple and economical manner at low equipment-related costs.

The invention accordingly provides a process for production of silica having variable thickening wherein
a) a product stream I comprising at least a vaporous, hydrolysable and/or oxidizable silicon compound,
b) a product stream II comprising oxygen and
c) a product stream III comprising at least a combustible gas are made to react, characterized in that
d) a feed port in a pipepiece A, said pipepiece A comprising one or more static mixing elements, is used to import product stream I into product stream II, or vice versa and thereby create product stream IV, then
e) a feed port in a pipepiece B, said pipepiece B comprising one or more static mixing elements, is used to import product stream III in product stream IV and thereby create product stream V,
f) product stream V leaving pipepiece B is imported into a reaction chamber, ignited therein and reacted in a flame, and
g) the resultant solid material is separated off.

Hydrolysable for the purposes of the invention is to be understood as meaning that the silicon compound in the presence of steam are transformed into silica and a byproduct which is gaseous under the reaction conditions. Examples thereof are:

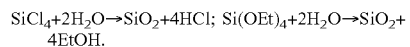

Oxidizable for the purposes of the invention is to be understood as meaning that the silicon compound in the presence of oxygen are converted into silica and a gaseous byproduct. An example thereof is: $SiCl_4+O_2 \rightarrow SiO_2+2Cl_2$.

In the context of the invention, volumes and velocities are specified in standardized form. $Nm^3$ represents a volume at a pressure of 1.01325 bar and a temperature of 0° C. Nm/s represents a standardized velocity calculated from the volume and a cross section.

Pipepieces A and/or B comprising the static mixing elements are static mixers where through the product streams to be mixed flow. They cause the formation of secondary flows extending across relatively large regions. Turbulent regions are also formed and lead to finer mixing. In principle, the choice of static mixer is not subject to any limitation. Examples of static mixers useful in the present invention are found for example in U.S. Pat. No. 4,758,098 or 5,522,661. And pipepieces A and B comprising the static mixing elements can be the same or different as regards their dimensions and the nature of the mixing elements.

Preferably, however, the process according to the invention utilizes flange mixers wherein mixing operations take place downstream of the static mixing elements. A flange mixer of this type is disclosed for example in U.S. Pat. No. 5,839,828 wherein the reaction stream to be introduced is fed via one or more diaphragms.

In EP-A-1153650 the reaction stream to be introduced is imported via ring metering means having a special vane arrangement.

It is particularly preferable for pipepieces A and/or B to be configured in the form of flange mixers as disclosed in EP-A-1302236. These have the vane arrangement disclosed in EP-A-1153650, but a single punctiform feed port is provided instead of the ring metering means.

Very particular preference is given to an embodiment utilizing the static mixer disclosed in EP-A-1493485. In this static mixer, internals arranged in a pipepiece comprise flat, folded or curved obstacles to flow and also constrictions therebetween, wherein the primary obstacles to flow are geometrically modified on their surfaces and/or at their edges, and these modifications are capable of inducing local streams of second order in a first product stream which superimpose on the flow of first order and thereby improve the quality of mixing in that radial and axial inhomogeneities in the fluid are rectified more effectively than by the flow of first order. The static mixer contains a feed port for a further product stream whereby said further product stream is introduced into a zone of the mixing region of the first product stream where the effect which the geometric modifications have on the flow is particularly pronounced. Explicit reference is made to FIG. 1 in EP-A-1493485.

In one particular embodiment of the invention, $L_A/D_A$ is =2-20, where $L_A$ is length of pipepiece A and $D_A$ is the internal diameter of pipepiece A. Particular preference is given to an embodiment wherein $L_A/D_A$ is =3-6.

In one further particular embodiment of the invention, $L_B/D_B$ is =2-20, where $L_B$ is length of pipepiece B and $D_B$ is the internal diameter of pipepiece B. Particular preference is given to an embodiment wherein $L_B/D_B$ is =3-6.

FIG. 1 is a schematic illustration of one embodiment of the invention. Key:

A, B=respectively pipepiece A and pipepiece B having the respective length L and the internal diameter D;

C=reaction chamber;

I-VII=product streams;

product stream I comprising at least a vaporous, hydrolysable and/or oxidizable silicon compound, product stream II comprising molecular oxygen, product stream III comprising at least a combustible gas, product stream IV produced by importing product stream I into product stream II, or vice versa, via a feed port in a pipepiece A comprising one or more static mixing elements, product stream V produced by importing product stream III into product stream IV via a feed port in a pipepiece B comprising one or more static mixing elements, product stream VI comprising oxygen and/or steam, product stream VII comprising at least the reaction products silica and water, optionally carbon dioxide and hydrochloric acid.

Figure 2A:
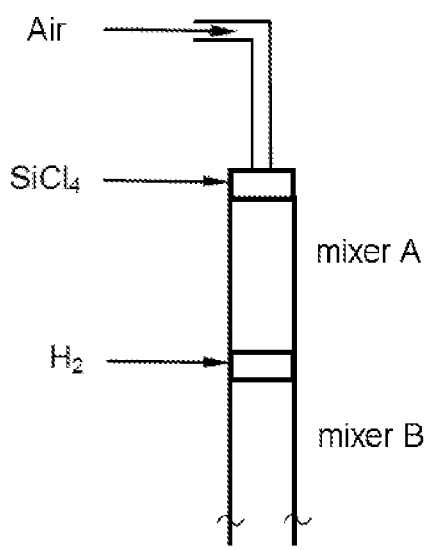
Figure 2B:
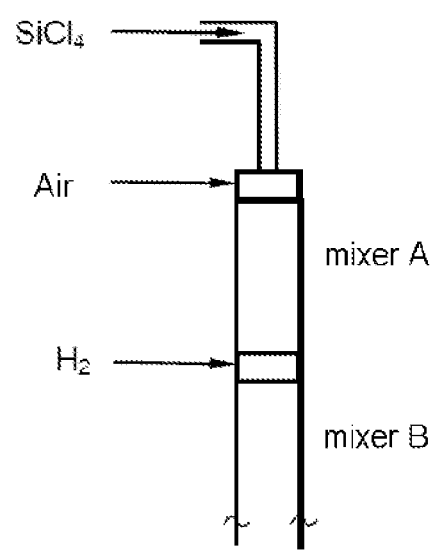

FIGS. 2A and 2B show possible embodiments of the invention as regards product streams I to III. FIG. 2A shows the feeding of the $SiCl_4$-containing product stream I into pipepiece A comprising one or more static mixing elements. FIG. 2B shows the feeding of the molecular oxygen-obtaining product stream II into pipepiece A comprising one or more static mixing elements. In both cases, product stream III is fed into pipepiece B comprising one or more static mixing elements.

In the process according to the invention, the velocity $v_B$ at which product stream III is imported into product stream IV is greater than the velocity $v_A$ of product stream IV at the time of importation of product stream III. Preference is given to an embodiment wherein $v_B/v_A \geq 4$. The velocity of product stream I and of product stream II is not critical as long as care is taken to ensure that product stream I remains in the vaporous state. The measures for this are known to a person skilled in the art. A general rule for the present invention is that the velocity of the product stream imported via the feed port of pipepiece A should be at least double the velocity of the other product stream.

$v_A$ is preferably at least 15 Nm/s. A range from 20 to 100 Nm/s has proved particularly suitable. $v_B$ is preferably at least 50 Nm/s. Particular preference is given to $100 \leq v_B \leq 1500$ Nm/s. To produce high-thickening silica, the process according to the invention is preferably carried out as an embodiment wherein hydrogen is used as combustible gas and $100 \leq v_B \leq 1500$ Nm/s and $20 \leq v_A \leq 50$ Nm/s. The stated velocities are standardized velocities. $v_A$ is the result of dividing the volume flow in $Nm^3/h$ by the cross-sectional area of pipepiece A. $v_B$ is the result of dividing the volume flow in $Nm^3/h$ by the cross-sectional area of the feed port.

It is known from the prior art that enhanced thickening can be achieved by increasing the imported quantity of combustible gas. It has now been found that thickening can be varied solely by varying the velocities $v_B$ at constant $v_A$. An increase in $v_B$, i.e. the velocity at which the combustible gas stream is imported into the product stream comprising the silicon compound and the molecular oxygen can lead to enhanced thickening.

In principle, the process is not limited to the production of particular silicas. It is preferably suitable for production of silicas having a BET surface area of 50-500 $m^2/g$, more preferably 100-400 $m^2/g$, even more preferably 150-350 $m^2/g$ and especially 180-280 $m^2/g$.

Variable thickening is to be understood as meaning that for substantially the same BET surface area it is possible to obtain silicas differing in thickening effect. Substantially the same BET surface area is any one specified BET surface area ±25 $m^2/g$, generally ±15 $m^2/g$. This means, for example, that silicas are obtainable with a BET surface area of 200±10 $m^2/g$ and a thickening effect of 3000-3700 mPas.

It is similarly possible to obtain silicas having substantially the same thickening effect coupled with significantly differing BET surface area. This means, for example, that silicas having a thickening effect of 3500±100 mPas are obtainable with a BET surface area of 110±10 $m^2/g$ and 200±10 $m^2/g$.

Thickening, in mPas, is determined in a dispersion of a silica in an unsaturated polyester resin having a viscosity of 1300±100 mPas at a temperature of 22° C. and measured with a rotary viscometer at a shear rate of 2.7 s and a temperature of 25° C. Suitable unsaturated polyester resins comprise cocondensates of ortho- and meta-phthalic acid and maleic or fumaric acid, or anhydrides thereof, and a low molecular weight diol, for example ethylene glycol, 1,2- or 1,3-propanediol, 1,2- or 1,3- or 1,4-butanediol or neo-pentyl glycol (($CH_3$)$_2$C($CH_2$OH)$_2$), or polyols, such as pentaerythritol, preferably dissolved at 30 to 80 wt %, preferably 60 to 70 wt %, in an olefinic reactive diluent as solvent, for example monostyrene. The viscosity of the polyester resin is 1300+/−100 mPas at a temperature of 22° C. 7.5 g of silica are imported into 142.5 g of polyester resin at a temperature of 22° C. and dispersed therein with a dissolver at 3000 $min^{-1}$. 60 g of this dispersion are admixed with a further 90 g of the unsaturated polyester resin and dispersal is repeated. An example of a useful unsaturated polyester resin is Ludopal® P6, BASF.

In general, the process according to the invention is carried out such that the amount of oxygen is at least sufficient to convert the silicon compound and the combustible gas. In this case, lambda is not less than 1. Lambda describes the ratio of feed oxygen to stoichiometrically needed oxygen. The stoichiometrically needed amount of oxygen when the reaction of silicon tetrachloride and hydrogen as combustible gas is used as an example is attributable to the two reaction equations

$$2H_2 + O_2 \rightarrow 2H_2O \text{ and } SiCl_4 + 2H_2O \rightarrow SiO_2 + 4HCl.$$

When other combustible gases and silicon compounds are used, corresponding equations must be drawn up. Gamma describes the ratio of feed hydrogen to stoichiometrically needed hydrogen.

Product stream I according to the present invention comprises at least a vaporous, hydrolysable and/or oxidizable silicon compound. Said product stream generally further comprises a carrier gas, for example air or an inert gas such as nitrogen. The vaporous, hydrolysable and/or oxidizable silicon compound used may be with particular preference $SiCl_4$, $CH_3SiCl_3$, $(CH_3)_2SiCl_2$, $(CH_3)_3SiCl$, $(CH_3)_4Si$, $HSiCl_3$, $(CH_3)_2HSiCl$, $CH_3CH_2CH_2SiCl_3$, $Si(OC_2H_5)_4$, $Si(OCH_3)_4$, or mixtures thereof.

Preference is given to using $SiCl_4$ alone or as constituent of mixtures. Suitable mixtures are in particular mixtures which in addition to $SiCl_4$ further comprise $(CH_3)_3SiCl$ and/or $HSiCl_3$. It is immaterial in this connection whether $SiCl_4$ is the main or a secondary component in these mixtures. Mixtures can for instance be used which in addition to $SiCl_4$ comprise 70 wt % or more of $CH_3SiCl_3$ or 10 wt % or more of $HSiCl_3$.

In one particular embodiment of the invention, the vaporous, hydrolysable and/or oxidizable silicon compound comprises the secondary product generated in the production of polycrystalline silicon from $HSiCl_3$ and comprising 60-99 wt % of $SiCl_4$ and 0.5-40% of $HSiCl_3$ as main constituents and $H_2SiCl_2$, $SiH_4$ and $H_3SiCl$ and HCl as secondary constituents at less than 5 wt %, each based on the secondary product.

Product stream II comprises oxygen. This will generally be air or oxygen-enriched air.

Product stream III comprises or consists essentially of one or more combustible gases. These are preferably selected from the group consisting of hydrogen, methane, ethane and/or propane. Hydrogen is particularly preferred.

Product stream IV comprises the vaporous, hydrolysable and/or oxidizable silicon compound and oxygen.

Product stream V comprises the vaporous, hydrolysable and/or oxidizable silicon compound, oxygen and combustible gas.

Product stream VI is optional and can be used to import oxygen, combustible gas and/or steam into the reaction chamber. This can be used to influence the flame and if necessary stabilize it.

Product stream VII comprises at least the reaction products silica and water. Depending on the structure of the silicon compounds used and of the combustible gas, carbon dioxide and hydrochloric acid may also be present.

In a further possible embodiment of the process according to the invention, the reaction mixture leaves the reaction chamber and is then cooled, preferably to temperatures of 80 to 250° C., and subsequently treated with steam, preferably at temperatures of 350 to 750° C., before the solid material is separated off.

EXAMPLES

CompaX mixers from Sulzer are used as pipepieces A and B comprising static mixing elements.

Example 1

Product stream I consists of 8 kg/h of vaporous silicon tetrachloride, has a velocity $v_I$ of 1.9 Nm/s and is mixed via the punctiform feed port, 3 mm in diameter, of a CompaX mixer A with $L_A/D_A=5$ into a product stream II, which consists of 11.9 $Nm^3/h$ air and has a velocity $v_{II}$ of 467.6 Nm/s. The velocity $v_A$ of resultant product stream IV is 23.4 Nm/s. A CompaX mixer B, which has the dimensions $L_B/D_B=5$ and whose punctiform feed port has a diameter of 1 mm, is used to import a product stream III in the form of 3.9 $Nm^3/h$ hydrogen into said product stream IV. The speed $v_B$ at which product stream III leaves the punctiform feed port is 1379.3 Nm/s. The way the feedstocks are added is shown in FIG. 2A. Resultant product stream V is imported into a reaction chamber via a nozzle 15 mm in internal diameter, resulting in a velocity $v_{RC}$ of 26.5 Nm/s, and ignited therein. Additionally imported into the reaction chamber is product stream VI consisting of 18 $Nm^3/h$ air. Resultant product stream VII, now comprising silica particles, hydrochloric acid, steam and air, is initially cooled down to a temperature of 120 to 150° C. The silica is subsequently filtered off and steam treated at a temperature of 400 to 500° C.

The silica has a BET surface area of 186 $m^2/g$ and a thickening effect of 3550 mPas at 22° C.

Examples 2 to 8 are carried out in a similar manner, the operational settings are reported in the table. It is evident that the different diameters of the feed port of Compax mixer B and the associated velocities $v_B$ produce for the same dimensions $L_A$, $D_A$, $L_B$ and $D_B$ and substantially the same $v_A$, silicas having substantially the same BET surface area, 186 to 218 $m^2/g$, and significantly differing thickening, 3575 to 4250 mPas.

Example 9 is a repeat of Example 1 except that product stream II is introduced into product stream I via the punctiform feed port of CompaX mixer A. $L_A/D_A$ is further=3. The way the feedstocks are added is shown in FIG. 2B. Operational parameters and product properties are reported in the table.

Examples 10 and 11 have the same operational parameters as Example 9 except that the length of pipepiece A comprising static mixing elements was varied. $L_A/D_A$ is 3 in Example 9, 6 in Example 10 and 15 in Example 11. While there is substantially the same BET surface area for the silicas obtained, thickening varies distinctly, from 3085 to 3495 mPas.

A mixture of methyltrichlorosilane and silicon tetrachloride is used in Example 12. For substantially the same BET surface area as in Examples 1 to 11, the silica obtained has very low thickening.

TABLE

Operational parameters and product properties

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Product stream I | | | | | | | | | | | | | |
| $SiCl_4$ | kg/h | 8 | 8 | 8 | 8 | 8 | 8 | 8 | 8 | 8 | 8 | 8 | 6[a] |
| $v_I$ | Nm/s | 1.9 | 1.9 | 1.9 | 1.9 | 1.9 | 1.9 | 1.9 | 1.9 | 1.9 | 1.9 | 1.9 | 1.6 |
| Product stream II[b] | | | | | | | | | | | | | |
| Air | $Nm^3/h$ | 11.9 | 12.3 | 12.1 | 12 | 11.9 | 11.95 | 12.05 | 12.05 | 13.2 | 13.2 | 13.2 | 12.9 |
| $v_{II}$ | Nm/s | 467.6 | 483.4 | 475.5 | 471.6 | 467.6 | 469.6 | 473.5 | 473.5 | 518.7 | 518.7 | 518.7 | 506.9 |
| $v_A$ | Nm/s | 23.4 | 24.1 | 23.7 | 23.6 | 23.4 | 23.5 | 23.6 | 23.6 | 25.7 | 25.7 | 25.7 | 24.9 |
| Product stream III | | | | | | | | | | | | | |
| $H_2$ | $Nm^3/h$ | 3.9 | 3.9 | 3.9 | 3.9 | 3.9 | 3.9 | 3.9 | 3.9 | 3.9 | 3.9 | 3.9 | 1.5 |
| Ø hole | Mm | 1.0 | 1.2 | 1.4 | 1.6 | 1.9 | 2.2 | 2.6 | 3.6 | 3 | 3 | 3 | 3 |
| $v_B$ | Nm/s | 1379.3 | 957.9 | 703.7 | 538.8 | 382.1 | 285.0 | 204.0 | 106.4 | 153.3 | 153.3 | 153.3 | 516.4 |
| $v_B/v_A$ | | 59.0 | 39.7 | 29.6 | 22.9 | 16.3 | 12.1 | 8.6 | 4.5 | 6.0 | 6.0 | 6.0 | 20.8 |
| Product stream V[c] | | | | | | | | | | | | | |
| lambda[d] | | 1.3 | 1.3 | 1.3 | 1.3 | 1.3 | 1.3 | 1.3 | 1.3 | 1.4 | 1.4 | 1.4 | 1.3 |
| $v_{RC}$[e] | Nm/s | 26.5 | 27.1 | 26.8 | 26.7 | 26.5 | 26.6 | 26.7 | 26.7 | 28.5 | 28.5 | 28.5 | — |

TABLE-continued

Operational parameters and product properties

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Product stream VI | | | | | | | | | | | | | |
| Air | Nm³/h | 18.0 | 18.0 | 18.0 | 18.0 | 18.0 | 18.0 | 18.0 | 18.0 | 19.0 | 19.0 | 19.0 | 18 |
| Silica | | | | | | | | | | | | | |
| BET | m²/g | 186 | 214 | 218 | 199 | 200 | 204 | 206 | 208 | 207 | 204 | 203 | 205 |
| Thickening | mPas | 3550 | 4250 | 3955 | 3625 | 3600 | 3575 | 3770 | 4070 | 3340 | 3085 | 3495 | 2580 |

$^{a)}$75:25 parts by weight CH$_3$SiCl$_3$/SiCl$_4$;
$^{b)}$diameter of hole for feed port of product stream II into product stream I: 3 mm;
$^{c)}$Diameter of feed port of product stream V in reaction chamber: 15 mm;
$^{d)}$gamma equals 1.9 in all examples;
$^{e)}$velocity of feed into reaction chamber

The invention claimed is:

1. A process for production of silica having variable thickening, the process comprising reacting:
   a) a product stream I comprising at least one silicon compound selected from the group consisting of a vaporous silicon compound, a hydrolysable silicon compound, and an oxidizable silicon compound,
   b) a product stream II comprising oxygen, and
   c) a product stream III comprising a combustible gas, wherein the process comprises:
   importing product stream I into product stream II, or importing product stream II into product stream I, through a feed port in a first pipe piece A to create product stream IV, wherein the first pipe piece A comprises at least one static mixing element;
   importing product stream III into product stream IV, through a feed port in a second pipe piece B to create product stream V, wherein the second pipe piece B comprises at least one static mixing element;
   importing product stream V leaving the second pipe piece B into a reaction chamber, igniting the reaction chamber, and reacting the product stream V in a flame; and
   separating solids resulting from igniting the reaction chamber and reacting the product stream V in the flame, wherein $V_B$ is a velocity with which the product stream III comprising a combustible gas is imported into the product stream IV, wherein $V_B$ is at least 50 Nm/s.

2. The process according to claim 1, wherein the at least one static mixing element of the first pipe piece A and of the second pipe piece B is designed as a flange mixer.

3. The process according to claim 2, wherein the flange mixer has a single punctiform feed port.

4. The process according to claim 1, wherein $V_B$ is a velocity with which the product stream III comprising a combustible gas is imported into the product stream IV, and $V_A$ is a velocity of the product stream IV at a point of importing the product stream III comprising a combustible gas, wherein $V_B/V_A$ is at least 4.

5. The process according to claim 1, wherein $V_A$ is a velocity of the product stream IV at a point of importing the product stream III comprising a combustible gas, wherein $V_A$ is at least 15 Nm/s.

6. The process according to claim 1, wherein $L_A/D_A$ is =2 to 20, where $L_A$=length of pipepiece A, and $D_A$=internal diameter of the first pipe piece A.

7. The process according to claim 1, wherein $L_B/D_B$ is =2 to 20, where $L_B$=length of pipepiece B, and $D_B$=internal diameter of the second pipe piece.

8. The process according to claim 1, wherein an amount of oxygen is at least sufficient to convert the at least one silicon compound and the combustible gas.

9. The process according to claim 1, wherein the at least one silicon compound is selected from the group consisting of SiCl$_4$, CH$_3$SiCl$_3$, (CH$_3$)$_2$SiCl$_2$, (CH$_3$)$_3$SiCl, (CH$_3$)$_4$Si, HSiCl$_3$, (CH$_3$)$_2$HSiCl, CH$_3$CH$_2$CH$_2$SiCl$_3$, Si(OC$_2$H$_5$)$_4$, Si(OCH$_3$)$_4$, and mixtures thereof.

10. The process according to claim 1, further comprising introducing a product stream VI comprising oxygen and/or steam into the reaction chamber.

11. The process according to claim 1, further comprising cooling a reaction mixture leaving the reaction chamber to form a cooled reaction mixture and treating the cooled reaction mixture with steal before separating the solids.

* * * * *